US010693826B2

(12) United States Patent
Pulla et al.

(10) Patent No.: US 10,693,826 B2
(45) Date of Patent: Jun. 23, 2020

(54) MESSAGE SERVICE

(71) Applicant: BLACKBERRY LIMITED

(72) Inventors: Gautam Pulla, Cupertino, CA (US); Gary Gilchrist, Burlingame, CA (US); Junjun Liu, Fremont, CA (US); Rejish Puthiyedath Cheruvatta, Coppell, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 239 days.

(21) Appl. No.: 15/513,114

(22) PCT Filed: Sep. 23, 2015

(86) PCT No.: PCT/US2015/051771
§ 371 (c)(1),
(2) Date: Mar. 21, 2017

(87) PCT Pub. No.: WO2016/049220
PCT Pub. Date: Mar. 31, 2016

(65) Prior Publication Data
US 2017/0310627 A1    Oct. 26, 2017

Related U.S. Application Data

(60) Provisional application No. 62/055,202, filed on Sep. 25, 2014.

(51) Int. Cl.
*G06F 15/16* (2006.01)
*H04L 12/58* (2006.01)
(Continued)

(52) U.S. Cl.
CPC .......... *H04L 51/24* (2013.01); *G06F 11/3055* (2013.01); *H04L 51/22* (2013.01);
(Continued)

(58) Field of Classification Search
CPC ......... H04L 51/22; H04L 51/34; H04L 51/32; H04L 51/10; H04L 51/18; H04L 51/38;
(Continued)

(56) References Cited

U.S. PATENT DOCUMENTS

| 6,886,035 B2 * | 4/2005 | Wolff ........................ G06F 9/52 709/203 |
| 2002/0087646 A1 | 7/2002 | Hickey et al. |
| 2008/0177845 A1 * | 7/2008 | Bracewell ............... H04L 51/22 709/206 |

FOREIGN PATENT DOCUMENTS

WO    2010/123475    10/2010

OTHER PUBLICATIONS

International Search Report and Written Opinion of the International Searching Authority issued in International Application No. PCT/US2015/051771 dated Dec. 16, 2015; 9 pages.

* cited by examiner

*Primary Examiner* — Chirag R Patel
*Assistant Examiner* — Rachel J Hackenberg
(74) *Attorney, Agent, or Firm* — Fish & Richardson P.C.

(57) ABSTRACT

Systems and methods for monitoring a plurality of mailboxes by a plurality of computer nodes. The plurality of computer nodes comprises a first computer node and a second computer node. The first computer node is configured to detect an update to a database record associated with a message store; determine, in response to detecting the update to the database record, a second computer node in the plurality of computer nodes to monitor the message store, based at least in part on an attribute stored in the database record; and update the database record to store an identifier corresponding to the second computer node. The second computer node is configured to: detect the update to the database record by the first computer node based at least in
(Continued)

part on the identifier; and configure a monitoring process for the message store based, at least in part, on the attribute stored in the database record.

14 Claims, 9 Drawing Sheets

(51) Int. Cl.
*G06F 11/30* (2006.01)
*G06F 11/34* (2006.01)

(52) U.S. Cl.
CPC .......... *H04L 51/34* (2013.01); *G06F 11/3006* (2013.01); *G06F 11/3433* (2013.01); *G06F 2201/86* (2013.01)

(58) Field of Classification Search
CPC ... H04L 51/00; H04L 51/046; H04L 67/1034; H04L 67/1044; H04L 67/28; H04L 67/327; G06F 2201/865; G06F 16/282; G06F 16/986; G06F 11/30; G06F 11/3006; G06F 33/3055; H04W 4/12; Y10S 707/99931
See application file for complete search history.

| EMAIL ADDRESS | CLIENT ADDRESS | MAILBOX SERVER | TENANT | ASSIGNMENT | TIMESTAMP |
|---|---|---|---|---|---|
| ⋮ | ⋮ | ⋮ | ⋮ | ⋮ | ⋮ |
| ⋮ | ⋮ | ⋮ | ⋮ | ⋮ | ⋮ |
| ⋮ | ⋮ | ⋮ | ⋮ | ⋮ | ⋮ |
| ⋮ | ⋮ | ⋮ | ⋮ | ⋮ | ⋮ |
| ⋮ | ⋮ | ⋮ | ⋮ | ⋮ | ⋮ |
| ⋮ | ⋮ | ⋮ | ⋮ | ⋮ | ⋮ |

*FIG. 2*

MESSAGE SERVICE

CROSS-REFERENCE TO RELATED APPLICATIONS

This application is a U.S. National Stage of PCT/US2015/051771 filed on Sep. 23, 2015, which claims the benefit of U.S. Provisional Application No. 62/055,202, filed Sep. 25, 2014, the contents of which are hereby incorporated in their entirety.

BACKGROUND OF THE INVENTION

Field of the Invention

The present invention relates to systems and methods for monitoring one or more message stores.

Description of the Related Technology

A message monitoring service monitors a mailbox for new events and sends a notification to a user device, such as a smartphone, when a new event for the user is detected. In this context, the mailbox may be associated with an email account and the new event may be receipt of a new email.

Where an email monitoring service monitors a large number of mailboxes simultaneously, it is important that the underlying architecture of a system provided for monitoring of the mailboxes is resilient and highly available.

One known system requiring a high availability architecture is a web server farm for handling requests for content from a large number of client devices according to the Hypertext Transfer Protocol (HTTP). In this example, an HTTP request is a short lived request, and assignment of a server in the web server farm can be performed on a random or pseudorandom basis without significant loss of performance or efficiency.

SUMMARY

A first aspect provides a system for monitoring a plurality of mailboxes by a plurality of computer nodes, the plurality of computer nodes comprising: a first computer node configured to: monitor a plurality of message stores hosted by a first server remote from the first computer node; receive an attribute associated with a message store in the plurality of message stores; and update a database record associated with the message store to store data indicative of the attribute; and a second computer node configured to: detect the update, made by the first computer node, to the database record; determine, in response to detecting the update to the database record, a third computer node in the plurality of computer nodes to monitor the message store, based at least in part on the data indicative of the attribute stored in the database record; update the database record to store an identifier corresponding to the third computer node.

According to some embodiments, the system further comprises a third computer node configured to: detect the update to the database record by the second computer node; and configure a monitoring process for monitoring the message store based, at least in part, on the data indicative of the attribute stored in the database record.

According to some embodiments, the second computer node is configured to update the database record associated with the message store to store time data indicative of the time at which the identifier indicative of the third computer node was stored in the database record by the second computer node.

According to some embodiments, the third computer node is configured to detect the update to the database record made by the second computer node based on the time data stored by the second computer node.

According to some embodiments, the first computer node is configured to: update the database record associated with the message store to indicate that the message store is not monitored by any of the computer nodes in the plurality of computer nodes; the second computer node is configured to: determine that the database record has been updated by determining that the message store is not monitored by any of the computer nodes in the plurality of computer nodes.

According to some embodiments, the database record is stored at a database server which is remote from the first computer node and the second computer node.

According to some embodiments, the attribute comprises data indicating that the data store is hosted by a second server, different from the first server, which is remote from the first computer node.

According to some embodiments, the message store is an email mailbox and the attribute is an attribute of the email mailbox.

A second aspect provides a system for monitoring a plurality of mailboxes by a plurality of computer nodes, the plurality of computer nodes comprising: a first computer node configured to: detect an update to a database record associated with a message store; determine, in response to detecting the update to the database record, a second computer node in the plurality of computer nodes to monitor the message store, based at least in part on an attribute stored in the database record; update the database record to store an identifier corresponding to the second computer node; and a second computer node configured to: detect the update to the database record by the first computer node based at least in part on the identifier; configure a monitoring process for the message store based, at least in part, on the attribute stored in the database record.

According to some embodiments, the first computer node is configured to update the database record associated with the message store to store time data indicative of the time at which the identifier corresponding to the second computer node was stored in the database record.

According to some embodiments, the second computer node is configured to detect the update to the database record made by the first computer node based on the time data stored by the first computer node.

According to some embodiments, the attribute comprises data identifying a server remote from the second computer node which hosts the message store.

According to some embodiments, the message store is an email mailbox and the attribute is an attribute of the email mailbox.

A third aspect provides a method for monitoring a plurality of mailboxes by a plurality of computer nodes, method comprising: monitoring a plurality of message stores hosted by a first server remote from the first computer node by a first computer node; receiving an attribute associated with a message store in the plurality of message stores at the first computer node; updating a database record associated with the message store to store data indicative of the attribute by the first computer node; detecting, at a second computer node, the update made by the first computer node to the database record; determining, by the second computer node and in response to detecting the update to the database record, a third computer node in the plurality of computer nodes to monitor the message store, based at least in part on the data indicative of the attribute stored in the database record; and updating the database record to store an identifier corresponding to the third computer node by the second computer node.

A fourth aspect provides: a method for monitoring a plurality of mailboxes by a plurality of computer nodes, the method comprising: detecting an update to a database record associated with a message store by a first computer node; determining, by the first computer node and in response to detecting the update to the database record, a second computer node in the plurality of computer nodes to monitor the message store, based at least in part on an attribute stored in the database record; updating the database record to store an identifier corresponding to the second computer node by the first computer node; detecting, at a second computer node, the update to the database record by the first computer node based at least in part on the identifier; and configuring, at the second computer node, a monitoring process for the message store based at least in part on the attribute stored in the database record.

A fifth aspect provides a non-transitory computer-readable storage medium comprising computer-executable instructions which, when executed by a processor, cause a computing device to perform a method for monitoring a plurality of mailboxes by a plurality of computer nodes, the method comprising: monitoring a plurality of message stores hosted by a first server remote from the first computer node by a first computer node; receiving an attribute associated with a message store in the plurality of message stores at the first computer node; updating a database record associated with the message store to store data indicative of the attribute by the first computer node; detecting, at a second computer node, the update made by the first computer node to the database record; determining, by the second computer node and in response to detecting the update to the database record, a third computer node in the plurality of computer nodes to monitor the message store, based at least in part on the data indicative of the attribute stored in the database record; and updating the database record to store an identifier corresponding to the third computer node by the second computer node.

A sixth aspect provides a non-transitory computer-readable storage medium comprising computer-executable instructions which, when executed by a processor, cause a computing device to perform a method for monitoring a plurality of mailboxes by a plurality of computer nodes, the method comprising: detecting an update to a database record associated with a message store by a first computer node; determining, by the first computer node and in response to detecting the update to the database record, a second computer node in the plurality of computer nodes to monitor the message store, based at least in part on an attribute stored in the database record; updating the database record to store an identifier corresponding to the second computer node by the first computer node; detecting, at a second computer node, the update to the database record by the first computer node based at least in part on the identifier; and configuring, at the second computer node, a monitoring process for the message store based at least in part on the attribute stored in the database record.

Further features and advantages of the invention will become apparent from the following description of preferred embodiments of the invention, given by way of example only, which is made with reference to the accompanying drawings.

BRIEF DESCRIPTION OF THE DRAWINGS

FIG. 2 is schematic diagram showing a database table for monitoring a plurality of mailboxes in accordance with an embodiment.

DETAILED DESCRIPTION OF CERTAIN INVENTIVE EMBODIMENTS

Figure 1:
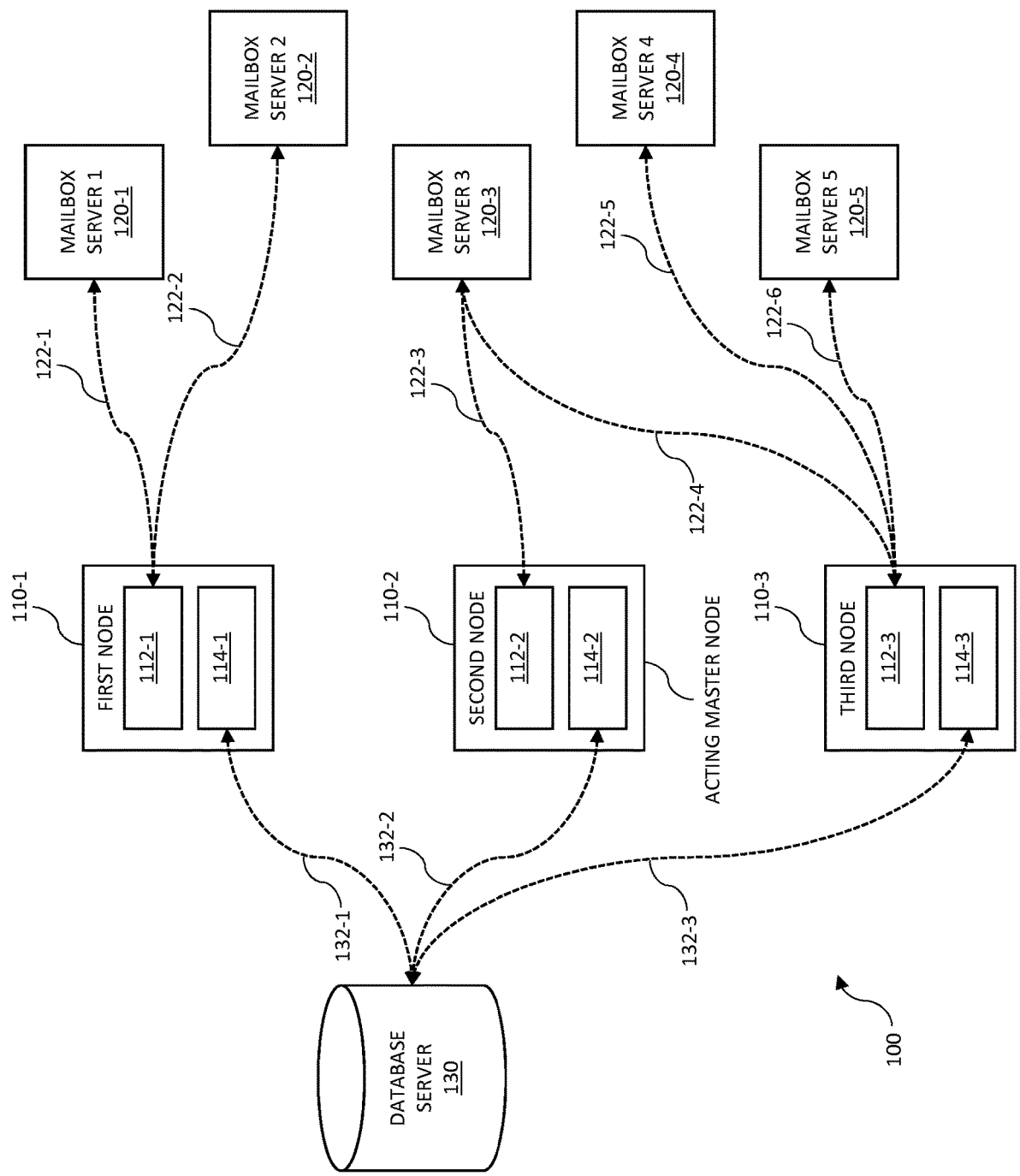
FIG. 1 is a schematic diagram showing a message system for monitoring a plurality of mailboxes in accordance with an embodiment.

FIG. 1 shows a message system 100 for monitoring a plurality of mailboxes. In this context, a mailbox may be considered to be a message store which stores a plurality of messages associated with a respective user account. For example, a mailbox may be an email message store associated with an email account, an instant message store associated with an instant messaging account, or any other form of data store associated with a corresponding user account where notifications may be forwarded to one or more associated client devices. The message system 100 includes a plurality of computing nodes 110 (hereinafter termed "monitoring nodes") which monitor mailboxes hosted by a plurality of mailbox servers 120 based on a database hosted by a database server 130. The monitoring nodes 110 each comprise a monitoring service 112 and optionally an assignment service 114. The monitoring service 112 of each monitoring node 110 is configured to monitor mailboxes hosted by the plurality of mailbox servers 120 and, in response to an event in respect of a particular mailbox monitored by the monitoring service 112, send a notification to an associated client device (not shown). In this context, the monitoring nodes 110 acts as "middlemen" between the mailbox servers 120 and the client devices in respect to changes to associated mailboxes. In order to facilitate the monitoring of mailboxes, the monitoring nodes 110 are configured to establish a plurality of monitoring sessions 122 with the plurality of mailbox servers 120 to receive notifications of new events from the mailbox servers 120.

The monitoring service 112 maintains a monitoring list (not shown) which includes details of the mailboxes monitored by the monitoring service 112, such as mailbox name and corresponding network address for the mailbox server 120 hosting the mailbox. The assignment service 114 is configured to monitor the database hosted by the database server 130 to detect assignment changes which affect the monitoring service 112 and to update the database to reflect changes in mailbox attributes for mailboxes monitored by the monitoring service 112.

The database server 130 is typically a highly available, highly redundant database server, which hosts a relational database based on the Structured Query Language (SQL). The database includes a plurality of database tables which store data relating to the mailboxes monitored by the system 100. With reference to FIG. 2, the database hosted by the database server 130 includes a database table 200 (hereinafter termed a "mailbox table"), which includes a plurality of database records 202 corresponding to rows in the mailbox table 200 (hereinafter termed "mailbox records"). Each mailbox record 202 corresponds to a mailbox monitored by the system 100 and includes a plurality of fields (hereinafter termed "mailbox fields") which specify mailbox attributes 204 associated with the respective mailbox. For example, each mailbox record 202 in the mailbox table 200 shown in FIG. 2 includes an email address field 204-1 identifying the mailbox, a client address field 204-2 specifying the client device to which notifications for the mailbox are to be delivered, a mailbox server field 204-3 identifying the address of the mailbox server 120 which hosts the mailbox (e.g. a uniform resource identifier (URI), a uniform resource locator (URL) or mailbox server identifier), a tenant field 204-4 identifying the tenant for the mailbox (i.e. a group, company or organization to which the corresponding mailbox belongs and sharing a common email domain), an assignment field 204-5 identifying the monitoring node 110 assigned for monitoring the mailbox for new events, and a timestamp field 204-6 indicating the time at which the respective mailbox record 202 was updated.

In some embodiments, the mailbox servers 120 allow a plurality of mailboxes to be monitored through a single monitoring session 122. For example, one or more of the mailbox servers 120 may be based on the EXCHANGE™ email server software developed by MICROSOFT® of Redmond, Wash., United States of America, which allows monitoring nodes 110 to authenticate as a "super user" and maintain a single continuously active connection for monitoring of multiple mailboxes, thus reducing the overall number of monitoring sessions or connections 122 required to monitor the mailboxes. In a similar manner, EXCHANGE™ email servers provide an "autodiscover" service, which enables the monitoring nodes 110 to determine or "discover" mailbox attributes, such as the address of the mailbox server 120, using an autodiscover request. Typically, the autodiscover service is tenant-specific and allows requesting monitoring nodes 110 to batch multiple mailboxes into a single autodiscover request.

Assignment of mailboxes to the monitoring nodes 110 is performed intelligently on the basis of various assignment criteria and on the basis of the mailbox attributes stored in the respective mailbox fields 204. For example, it is typically advantageous to assign mailboxes hosted by the same mailbox server 120 to the same monitoring node 110 (i.e. to collocate monitoring of mailboxes hosted by the same mailbox server 120) such that those mailboxes may be monitored using a single monitoring session or connection 122, thereby improving scalability. For similar reasons, it is often advantageous to assign mailboxes associated with a common tenant to the same monitoring node 110 to benefit from the efficiency savings available from batch processing of autodiscovery requests in the manner described above. Moreover, mailboxes associated with a common tenant are often hosted by the same mailbox server 120, thereby enabling consolidated monitoring via a single monitoring session 122. In this regard, the assignment criteria may specify that all mailboxes monitored via a particular monitoring session 122 must belong to the same tenant, thereby preventing mailboxes for multiple tenants being monitored via the same monitoring session 122. Further considerations which are accounted for by the mailbox assignment process include the requirement for an even distribution of mailboxes across the monitoring nodes 110 for load balancing, and dynamic reassignment of mailboxes from "unhealthy" to "healthy" monitoring nodes 110. Typically, assignment of mailboxes on the basis of these assignment criteria is complex and does not lend itself to distributed assignment by the plurality of monitoring nodes.

Figure 7:
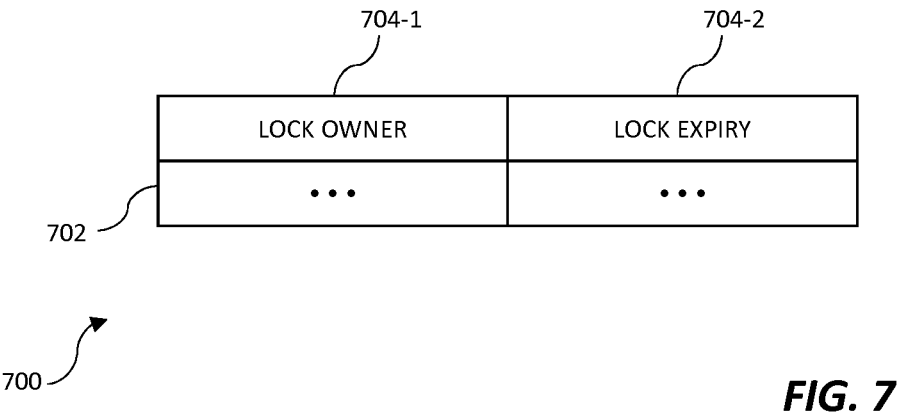
FIG. 7 is a schematic diagram showing a database table for a distributed lock mechanism in accordance with an embodiment.
Figure 8:
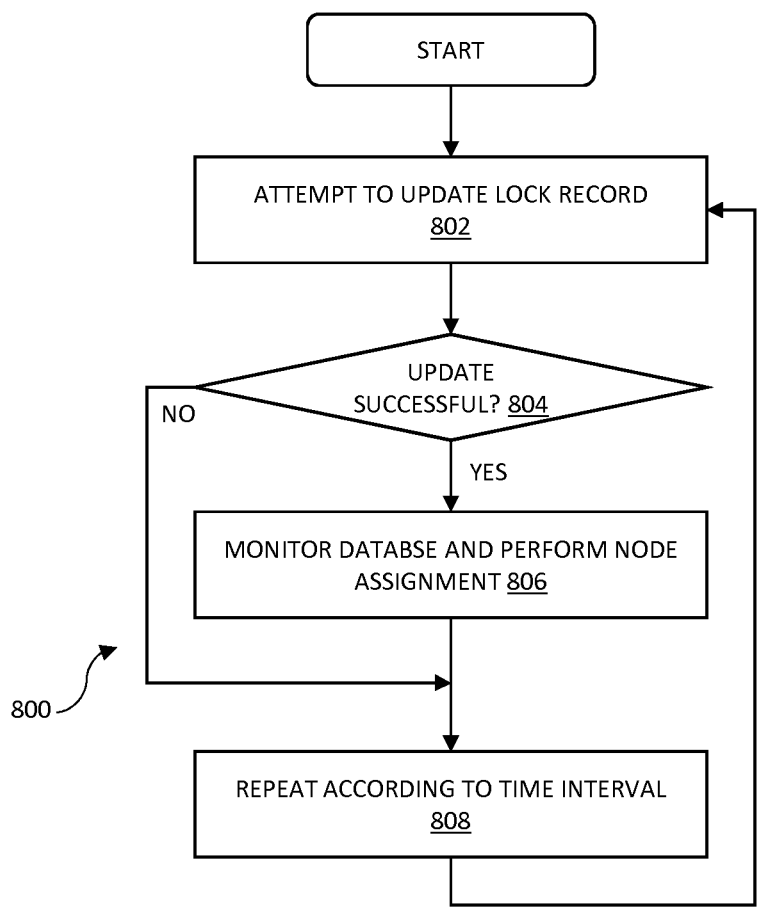
FIG. 8 is a flow chart showing a method for determining a computing node for assigning mailboxes based on a distributed lock mechanism in accordance with an embodiment.

According to the embodiment shown in FIG. 1, the task of assigning mailboxes to appropriate monitoring nodes 110 is centralized to one of the monitoring nodes 110 which functions as a "master node". Providing centralized assignment of mailboxes allows implementation of an assignment algorithm based on complex assignment criteria, whilst also meeting load balancing requirements. In contrast, distributed assignment by the plurality of monitoring nodes 110 would require the additional complexity of node-to-node communications between the monitoring nodes 110 and does not lend itself to efficient load balancing. In this regard, it will be appreciated that a distributed assignment function must typically use simpler assignment criteria in comparison to a centralized assignment function, and is therefore less suitable for effective exploitation of the efficiency savings available through connection consolidation. In the present embodiment, each of the monitoring nodes 110 includes the functionality necessary to function as the master node for assignment purposes and a distributed lock mechanism, described below in more detail with reference to FIGS. 7 and 8, is used to select which of the monitoring nodes 110 adopts the master node role. For the purpose of the following description, it is assumed that one of the monitoring nodes 110 of FIG. 1 has adopted the role of master node and as such provides the assignment function described above.

The master node effects assignment of a given mailbox to a particular monitoring node 110 by updating the assignment field 204-5 of the respective mailbox record 202 such that it stores an identifier (e.g. a network address or server name) corresponding to the assigned monitoring node 110. When updating the assignment field 204-5 to effect the assignment, the master node also updates the respective timestamp field 204-6 to store a timestamp indicating the time at which the mailbox was assigned to the monitoring node 110 identified by the respective assignment field 204-6. Provision of a timestamp in this manner provides a mechanism for the monitoring nodes to determine or detect newly assigned mailboxes on an incremental basis, as described below with reference to FIGS. 3 to 6.

Figure 3:
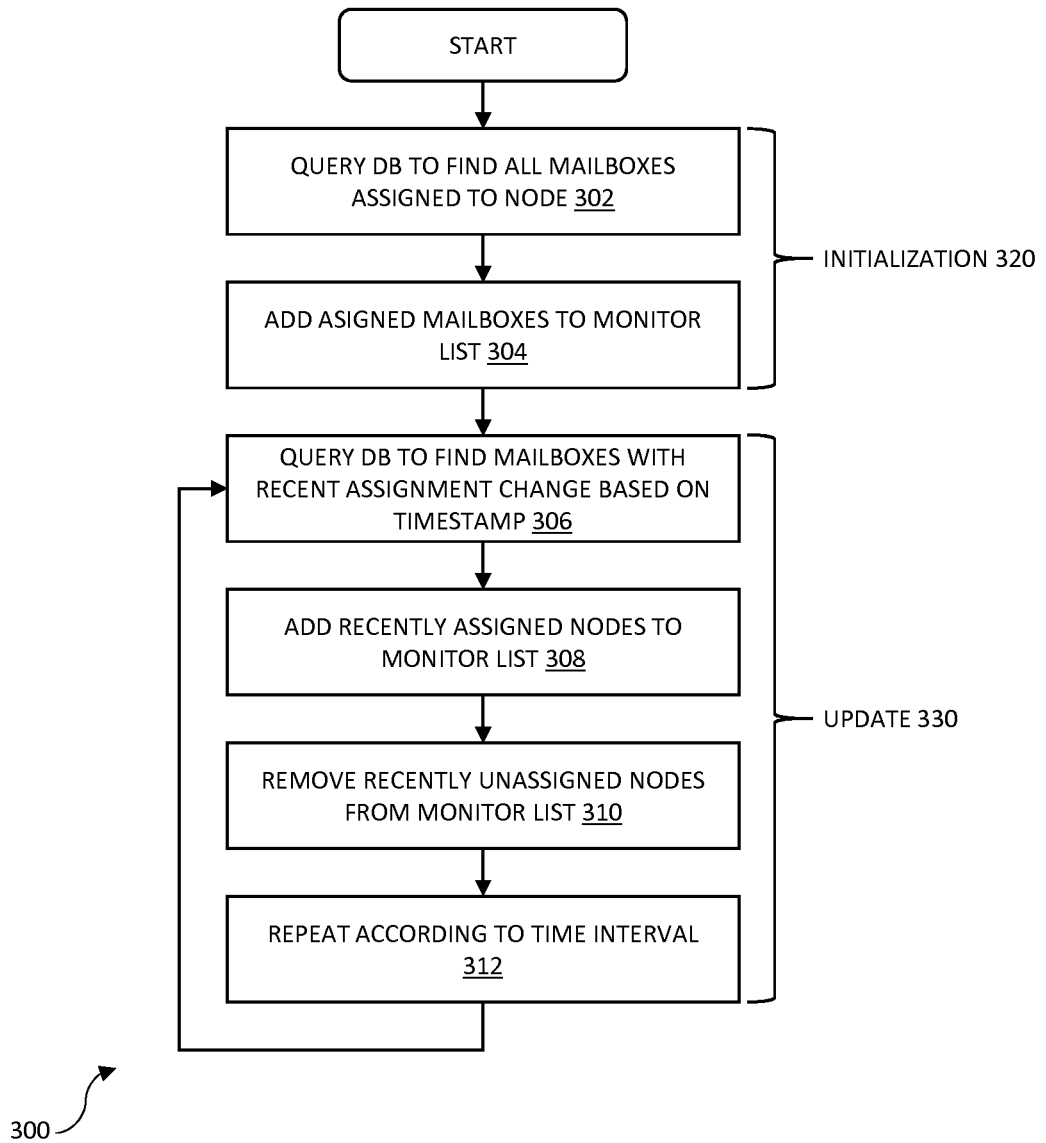
FIG. 3 is a flow chart showing a method of determining a mailbox assigned to a computer node in accordance with an embodiment.

FIG. 3 shows a method 300 performed by each of the monitoring nodes 110 to determine assigned mailboxes. In this embodiment, the method 300 is performed by the third monitoring node 110-3 but it will be appreciated that the method may be performed by any of the plurality of monitoring nodes 110 of FIG. 1. The method 300 includes an initialization stage 320 during which the monitoring node 110-3 queries the mailbox table to determine all mailboxes assigned thereto, and an update stage 330 wherein the monitoring node 110-3 periodically queries the database for incremental updates, including assigned mailboxes and reassigned mailboxes. In a first step, the monitoring node 110-3 queries the mailbox table 200 to determine all mailboxes assigned to the monitoring node 110-3 [step 302]. For example, the monitoring node 110-3 may execute an SQL statement to find all mailbox records 202 for which the assignment field 204-5 includes an identifier corresponding to the particular monitoring node 110-3. Once the assigned mailboxes have been determined, the monitoring node 110-3 adds the assigned mailboxes to its respective monitoring list, establishes a monitoring session with the mailbox servers 120 as required, and proceeds to monitor the assigned mailboxes for new events [step 304].

Once the initialization stage 320 has completed, the monitoring node 110-3 proceeds to the update stage 330, wherein the monitoring node 110-3 periodically queries the mailbox table 200 to determine mailboxes which have been assigned and/or reassigned from the monitoring node 110-3 during a predetermined monitoring period or interval. First, the monitoring node 110-3 queries the mailbox table 200 to determine all mailbox records 202 which have been updated by the master node since the initial query at step 302 [step 306]. As described above, this query may, for example, be an SQL statement which returns all mailbox records with a timestamp field 204-6 which indicates a time later than the time at which the query of step 302 was executed. In the present example, the query at step 306 returns data indicating that mailbox records 202-1 and 202-2 have been assigned or reassigned by the master node since step 302. In this example, the mailbox associated with mailbox record 202-1 has been assigned to the monitoring node 110-3 and the mailbox record 202-2 has been reassigned from the monitoring node 110-3 during the preceding time period. Next, the monitoring node 110-3 examines the returned data to identify mailboxes assigned to the monitoring node 110-3 but not currently monitored and adds the mailbox identified by mailbox record 202-1 to its respective monitoring list [step 308]. Similarly, the monitoring node 110-3 examines the returned data to identify mailboxes currently monitored by the monitoring node 110-3 but now assigned to a different monitoring node 110 (e.g. the first monitoring node 110-1 or the second monitoring node 110-2), and removes the mailbox identified by mailbox record 202-2 from its respective monitoring list [step 310]. Once the monitoring list has been updated at steps 308 and 310 to add newly assigned mailboxes and remove newly reassigned mailboxes, the monitoring node 110-3 proceeds to wait the predetermined time monitoring period before repeating the update monitoring stage 330 from step 306.

Typically, the assignment of a mailbox record 202 to a monitoring node 110 by the master node is a two-step process; for example: (i) obtain a current timestamp at a first time, T0; and (ii) update the assignment field 204-5 of the mailbox record 202 to indicate the assigned monitoring node 110 at a second time, T2, shortly after T0. It will be appreciated that this two-step process may be incomplete if a monitoring node queries the mailbox table 200 at an intermediate time T1, where T0<T1<T2, which may result in the querying monitoring node 110 "missing" an assigned mailbox because the mailbox has not been assigned at time T1. Moreover, if the same monitoring node 110 subsequently runs the query again at T3, where T3=T1+monitoringInterval, where monitoringInterval is the predetermined monitoring interval mentioned above, the monitoring node will still fail to detect the assigned mailbox because the timestamp written by the master node indicates the time T0 which is earlier than time T1. To account for this lack of atomicity when assigning monitoring nodes 100, and also the finite time period associated with running the query and processing the changed mailbox records 202 returned by the query, some embodiments employ a modified algorithm based on a cutoffTime which is used to query the database for changed mailboxes. Initially, the cutoffTime for a particular monitoring node 110 is set to a minimum time value (e.g. zero) and the monitoring node 100 queries the mailbox table 200 to find all mailbox records 202 which have changed since cutoffTime-padding. Here, padding is a "padding" interval which is greater than the time interval between T2 and T0 and is provided to account for the lack of atomicity when assigning monitoring nodes 110, as discussed above. This query returns all mailbox records 202 which have changed between cutoffTime-padding and scanStartTime, which is the time at which the monitoring node 100 in question initiated the database query. Once the changed mailbox records 202 returned by the query have been processed, the monitoring node 110 sets the cutoffTime equal to the scanStartTime and waits for the monitoringInterval before performing a further database query. Typically, the time interval between T2 and T0 is small (in the order of several milliseconds) so, where the monitoring interval is ten seconds, a padding time of 2 seconds is normally adequate.

It will be appreciated that further methods can be employed by the monitoring nodes 110 to detect mailboxes which have been reassigned to other monitoring nodes 110. For example, when a monitoring node 110 sends a notification to a client device, it typically queries the mailbox table to determine the client address field 204-2 to which the notification should be delivered for the respective mailbox record 202. At this time, the monitoring node may also check the corresponding assignment field 204-5 to confirm that the mailbox is still assigned to the monitoring node 110 and, if not assigned, remove the mailbox from the respective monitoring list.

Figure 4:
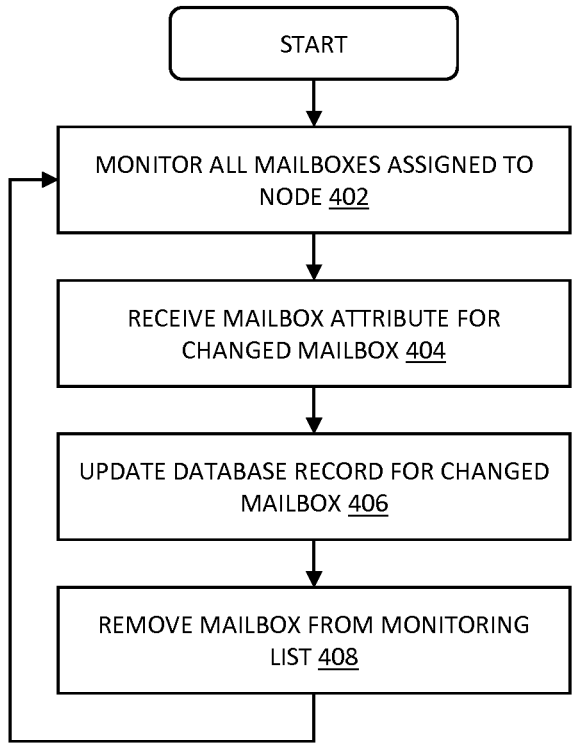
FIG. 4 is a flow chart showing a method of updating a database in response to detecting a change to a mailbox in accordance with an embodiment.

Preferably changes to attributes for a given mailbox are propagated to the corresponding mailbox fields 204 in the mailbox table 200 in a timely manner, such that the master node can assign or reassign the mailbox in question to ensure notifications can be sent to the end user. For example, if the mailbox server 120 which hosts a mailbox changes, it is important to propagate this change to the corresponding mailbox record 202, such that the master node can, if appropriate, reassign monitoring of the mailbox to a different monitoring node 110. In this regard, FIG. 4 shows a method 400 which is performed by the monitoring nodes 110 to detect changes to mailbox attributes for a given mailbox, and propagate those changes to the corresponding mailbox record 202 in a timely manner. In this embodiment, the method 400 is performed by the first monitoring node 110-1 but it will be appreciated that the method 400 may be performed by any of the plurality of monitoring nodes 110 of FIG. 1. Initially, the monitoring node 110-1 monitors the mailboxes specified in its respective monitoring list for new events in the normal manner [step 402]. In this example, the monitoring node 110-1 monitors a mailbox corresponding to mailbox record 202-5 which is hosted by the second mailbox server 120-2. At a subsequent time, the monitoring node may detect a changed mailbox attribute for the mailbox associated with mailbox record 202-5, or receive data from the mailbox server 120 associated with a changed attribute [step 404], in response to which the monitoring node 110-1 access the database server 130 and updates the corresponding mailbox record 202-5 for the mailbox [step 406]. When updating the corresponding mailbox record 202-5, the monitoring node 110-1 also updates the assignment field 204-5 for the mailbox record 202-5 to indicate that the mailbox is not assigned to a monitoring node, updates the timestamp field 204-6 for the mailbox record 202-5 with the current timestamp, and removes the mailbox from its monitoring list [step 408]. This last step ensures that the master node identifies that the mailbox is unassigned and proceeds to reassign the node as described below with reference to FIG. 5.

Figure 5:
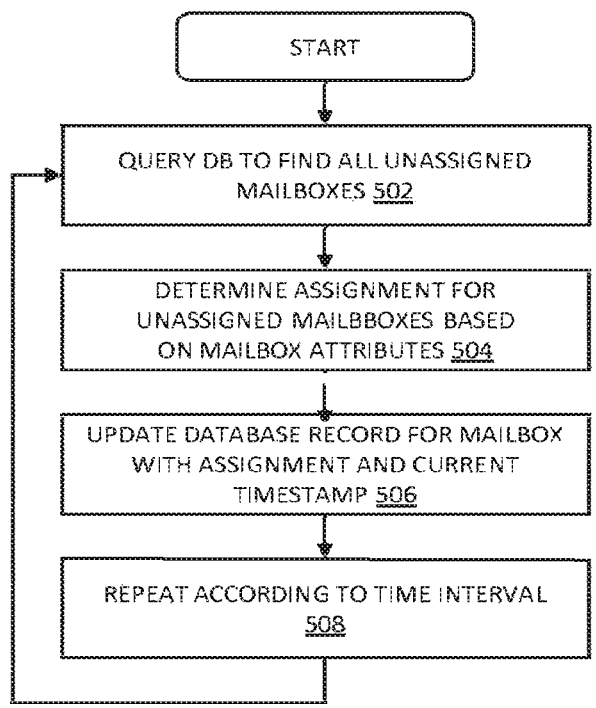
FIG. 5 is a flow chart showing a method of assigning a mailbox to a computer node in accordance with an embodiment.
Figure 6:
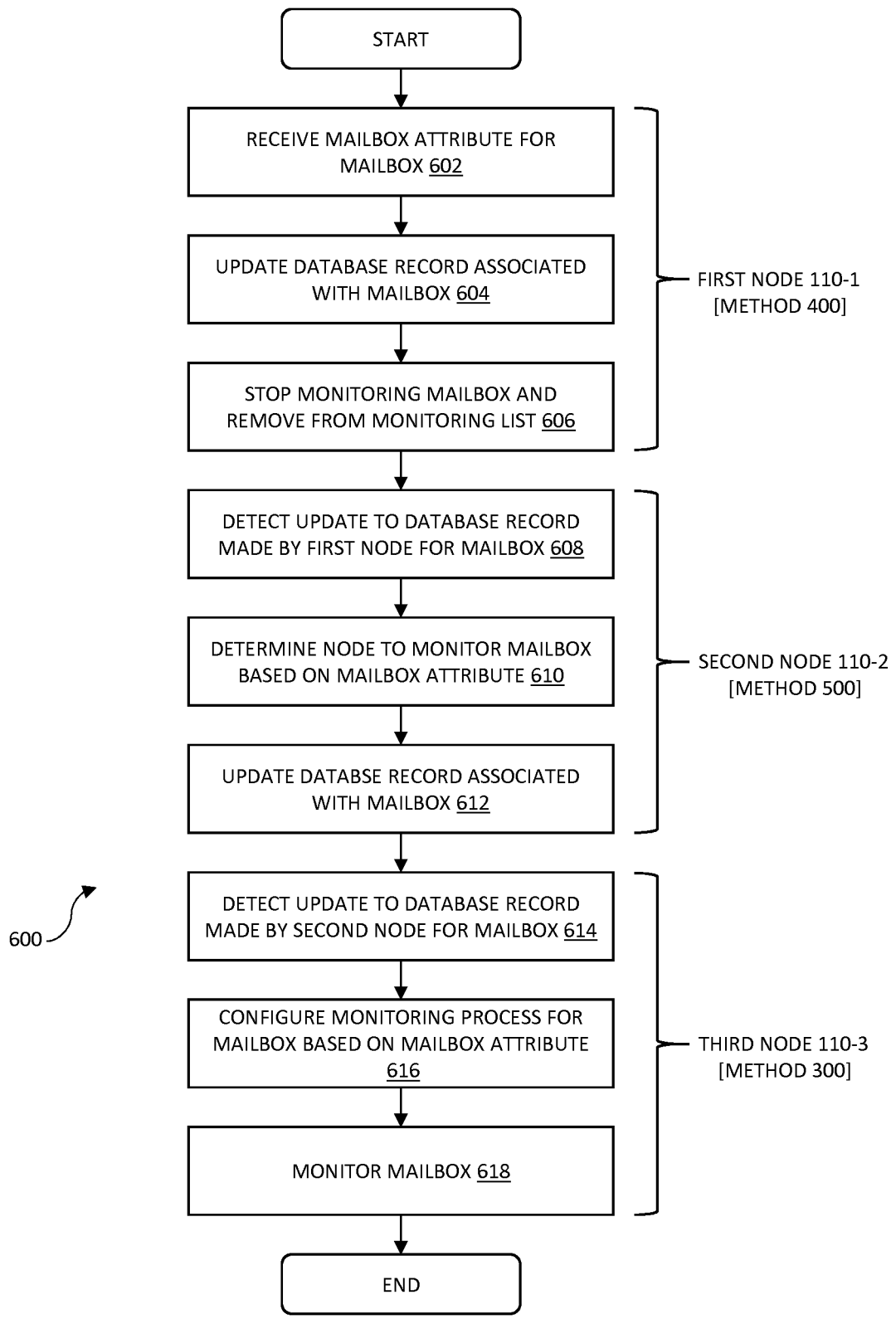
FIG. 6 is a flow chart showing a method of assigning a mailbox to a computer node in response to detecting a change to a mailbox in accordance with an embodiment.

FIG. 5 shows a method 500 performed by the master node for efficient detection and reassignment of mailboxes with changed mailbox attributes, according to an embodiment. Specifically, method 500 provides for detection of changed mailbox attributes propagated to the mailbox table 200 by a monitoring node 110 according to method 400 of FIG. 4. In this embodiment, the method 500 is performed by the second monitoring node 110-2 which acts as the master node for system 100 but it will be appreciated that the method 500 may be performed by any of the plurality of monitoring nodes 110 of FIG. 1 which have assumed the master node role. According to the method 500, the monitoring node 110-2 queries the mailbox table 200 to find all mailbox records 202 which are not assigned to a monitoring node [step 502]. This step will return mailbox records 202 which were updated as a result of method 400 of FIG. 4, in response to detection of a changed mailbox attribute detected by assigned monitoring node 110. In this example, step 502 returns data indicating that mailbox record 202-5 is not currently assigned to a monitoring node 110. Next, the monitoring node 110-2 determines a suitable monitoring node 110 for assignment to unassigned mailbox record 202-5 on the basis of respective mailbox attributes 204 and the assignment criteria discussed above [step 504]. Once an assignment has been determined at step 504, the monitoring node 110-2 updates the assignment fields 204-5 for the respective mailbox record 202-5 and saves the current timestamp to the respective timestamp field 204-6 [step 506]. Once the mailbox record 202-5 has been updated, the monitoring node 110-2 waits for a predetermined time interval, before repeating the method from step 502 [step 508]. In this context, it will appreciated that updating the respective timestamp fields 204-6 for reassigned nodes at step 506 ensures that newly assigned monitoring nodes 110 will automatically pick up reassigned mailboxes when periodically executing method 300 of FIG. 3, as discussed above.

In addition or as an alternative to the method 400 described above with reference to FIG. 4, some embodiments may employ a periodic refresh operation to detect changes to mailboxes hosted by the mailbox server 120 and to provide periodic rebalancing of mailbox assignments. Using the first monitoring node 110-1 as an example, the monitoring node 110-1 first refreshes the mailbox attributes for respective monitored mailboxes on a periodic basis (e.g. every 24 hours) using, for example, the autodiscovery request discussed above. Next, the monitoring node 110-1 updates any changed mailbox attributes in the appropriate mailbox records 202 stored at the database server 130 and clears the assignment field 204-5 for all mailbox records 202 monitored by the monitoring node 110-1, even if the associated mailbox attributes for the respective mailboxes have not changed. Clearing the assignment fields 204-5 in this manner ensures that the master node (e.g. the second monitoring node 110-2) determines an assignment for the associated mailboxes even if the associated mailbox attributes have not changed, thereby ensuring that mailboxes can be reassigned for load balancing purposes irrespective of any change to the respective mailbox attributes. This periodic refresh is particularly advantageous for load balancing when new monitoring nodes 110 are added to the system 100 or a previously failed monitoring node 110 returns to an operational state.

It will be understood that methods 300, 400 and 500 of FIGS. 3, 4 and 5 respectively interact to effect efficient reassignment of a mailbox in response to detection of a changed mailbox attribute by one of the monitoring nodes 110. An example of the interaction between these methods in accordance with an embodiment is provided by FIG. 6, which illustrates an embodiment in which second monitoring node 110-2 acts as the master node for mailbox assignment, and the first monitoring node 110-1 is initially assigned to a mailbox corresponding to mailbox record 202-1 for monitoring. The method 600 starts when the first monitoring node 110-1 detects a changed mailbox attribute for the mailbox corresponding to mailbox record 202-1 and receives or obtains the changed mailbox attribute [step 602]. Typically this detection is based on status information provided by the mailbox server 120-2 currently indicated by the mailbox server field 204-3 for the mailbox record 202-1, with which the first monitoring node 110-1 has established a monitoring session 122-2. In response to receiving the changed mailbox attribute, the first monitoring node 110-1 accesses the database server 130 and updates the mailbox record 202-1 to include the changed mailbox attribute, updates the timestamp field 204-6 with the current timestamp, and updates the assignment field 204-5 to indicate that the corresponding mailbox is not currently assigned to a monitoring node 110 [step 604]. Simultaneously with or shortly after updating the mailbox record 202-1 at step 604, the first monitoring node 110-1 removes the mailbox from its monitoring list and ceases monitoring of the mailbox [step 606]. The update to the mailbox record 202-1 performed at step 606 by the first monitoring node 110-1 is detected by the second monitoring node 110-2, acting as master node when the second monitoring node 110-2 periodically queries the mailbox table 200 to identify unassigned mailbox records 202 [step 608]. Upon detection of the updated mailbox record 202-1, the second monitoring node 110-2 determines a suitable monitoring node 110 for assignment to the unassigned mailbox record 202-1 on the basis of its respective mailbox attributes 204 (including the changed mailbox attribute) and the assignment criteria discussed above [step 610]. In the present example, changed mailbox attribute indicates that the mailbox associated with mailbox record 202-1 is now hosted by mailbox server 120-4 and the second monitoring node 110-2 determines that the mailbox should be assigned to the third monitoring node 110-3 (i.e. reassigned to a different node) and proceeds to update the assignment field 204-5 for the mailbox record 202-2 to store an identifier corresponding to the third monitoring node 110-3 [step 612]. The update to the mailbox record 202-1 performed at step 612 by the second monitoring node 110-2 is detected by the third monitoring node 110-3 when the third monitoring node 110-3 periodically queries the mailbox table 200 to identify incremental assignment changes, based on the updated timestamp field 204-6 for the mailbox record 202-1 [step 614]. Upon detecting the updated mailbox record 202-1, the third monitoring node 120-3 configures a monitoring process for the mailbox based on the mailbox attributes 204 for the updated mailbox record 202-1 and updates its respective monitoring list to include the mailbox [step 616]. Finally, the third monitoring node 110-3 proceeds to monitor the mailbox hosted at mailbox server 120-4 and, in response to detecting new events for the mailbox, forwards notifications to the associated client device in the normal way [step 618].

FIG. 7 shows a database table 700 (hereinafter termed a "lock table") hosted by the database server 130 and for use in a distributed lock mechanism in accordance with an embodiment. The lock table 700 includes a single record 702 (hereinafter termed a "lock record") which represents a distributed lock and includes a plurality of fields 704 for specifying the current lock (hereinafter termed "lock fields"). In the present embodiment, the lock record includes a lock owner field 704-1 which specifies the monitoring node 110 which "owns" the distributed lock (e.g. based on a node identifier) and a lock expiry field 704-2 which specifies the time when the lock ownership expires.

In some embodiments, at least some of the monitoring nodes 110 attempt to acquire the lock specified in the lock table 700 by performing the method 800 shown in FIG. 8. According to this embodiment, the method 800 is performed by the first monitoring node 110-1 but it will be appreciated that the method may be performed concurrently by two or more of the monitoring nodes 110. In a first step, the monitoring node 110-1 attempts to write to the lock record 702 to take ownership of the distributed lock [step 802]. This step may, for example, be achieved by executing a transactional SQL UPDATE statement, formed according to the following pseudo code:

```
UPDATE DistributedLock
    SET owner = 'currentNode' AND lockedUntil =
CURRENT_TIMESTAMP ( ) + lockDuration
        WHERE owner != 'currentNode' AND lockedUntil <
CURRENT_TIMESTAMP ( )
```

In the above pseudo code, the DistributedLock corresponds to the lock table 700, owner corresponds to the lock owner field 704-1 of the lock record 702, the currentNode corresponds to the identity of the monitoring node 110 which executes the statement, lockedUntil corresponds to the lock expiry field 704-2 of the lock record 702, and lockDuration corresponds to the period of time for which a new lock remains valid or in force. By executing the above, statement, the monitoring node 110-1 attempts to set itself as owner of the distributed lock, if the monitoring node 110-1 is not the current owner and the lock has not yet expired. When more than one of the monitoring nodes 110 execute the above statement concurrently, it is only possible for one of the monitoring nodes 110 to successfully acquire the distributed lock. After executing the statement at step 802, the monitoring node 110-1 checks to determine whether it has successfully acquired the distributed lock [step 804]. For example, where the statement is an SQL UPDATE according to the above pseudo code, the requesting monitoring node 110-1 can check the return value for the SQL UPDATE statement to determine whether it was successful at updating the lock record 702. If the monitoring node 110-1 successfully acquires the distributed lock, it assumes the role of a master node and proceeds to monitor the mailbox table 200 and assignment mailboxes in the manner described above with reference to FIGS. 1 to 6 [step 806]. In contrast, if the monitoring node 110-1 fails to acquire the distributed lock (i.e. the lock has already been acquired by the second monitoring node 110-2 or the third monitoring node 110-3), the monitoring node 110-1 does not assume the role of master node and proceed to repeat the method 800 after a predetermined time interval [step 808].

According to the above pseudo code, the lockDuration is predetermined time period during which a lock remains valid. Typically, the time interval according to which the monitoring nodes 110 execute the above pseudo code must be much shorter that the lockDuration time to ensure the master node is able to renew its lock multiple times within the lockDuration period, and thus ensure that the master status remains stable (i.e. a monitoring node remains the master node until if fails).

Figure 9:
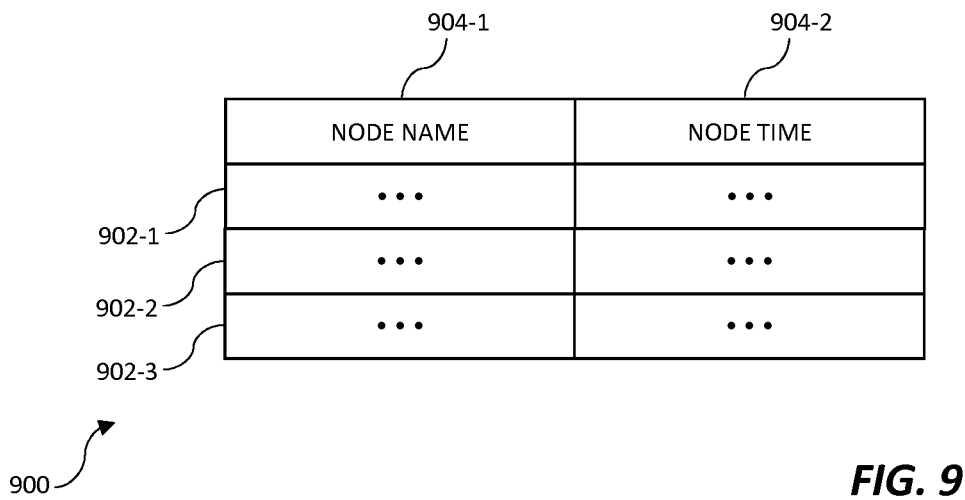
FIG. 9 is a schematic diagram showing a database table for a monitoring health of a plurality of computing nodes in accordance with an embodiment.

According to some embodiments, the "health" of each of the monitoring nodes 110 is monitored to enable detection of "unhealthy" monitoring nodes and to ensure that mailboxes which are assigned to unhealthy nodes are reassigned to "healthy" monitoring nodes 110. FIG. 9 shows an example of a database table 900 (hereinafter termed a "node table") hosted by the database server 130 for monitoring the health of the monitoring nodes 110. The node table 900 includes a plurality of records 902 (hereinafter termed "node records") corresponding to respective monitoring nodes in the system 100. The node records 902 include a plurality of fields 904 (hereinafter termed "node fields"), including a node name field 904-1 and a node time field 904-2. For a particular node record 902, the node name field 904-1 stores the server name or server identifier for the respective monitoring node 100, and the node time field 904-2 includes a timestamp indicating the last time the respective monitoring node 110 accessed the node table 900 and updated its respective record. In the present embodiment, each of the monitoring nodes 110 is configured to periodically access their respective node record 902 and update the associated node time field 904-2 to the current time, to indicate that the monitoring node in question remains healthy. If a given monitoring node 110 crashes, the time indicated by its respective node time field 904-2 will "age" as the monitoring node 110 is unable to update the timestamp. Similarly, a monitoring node 110 may also monitor one or more heuristic measures of health, such as the percentage of monitoring errors encountered by users on a per-mailbox basis for the monitoring node 110 in question and, if the number of errors exceeds a threshold, the monitoring node 110 may stop updating the node time field 904-2 for the corresponding node record 902.

Figure 10:
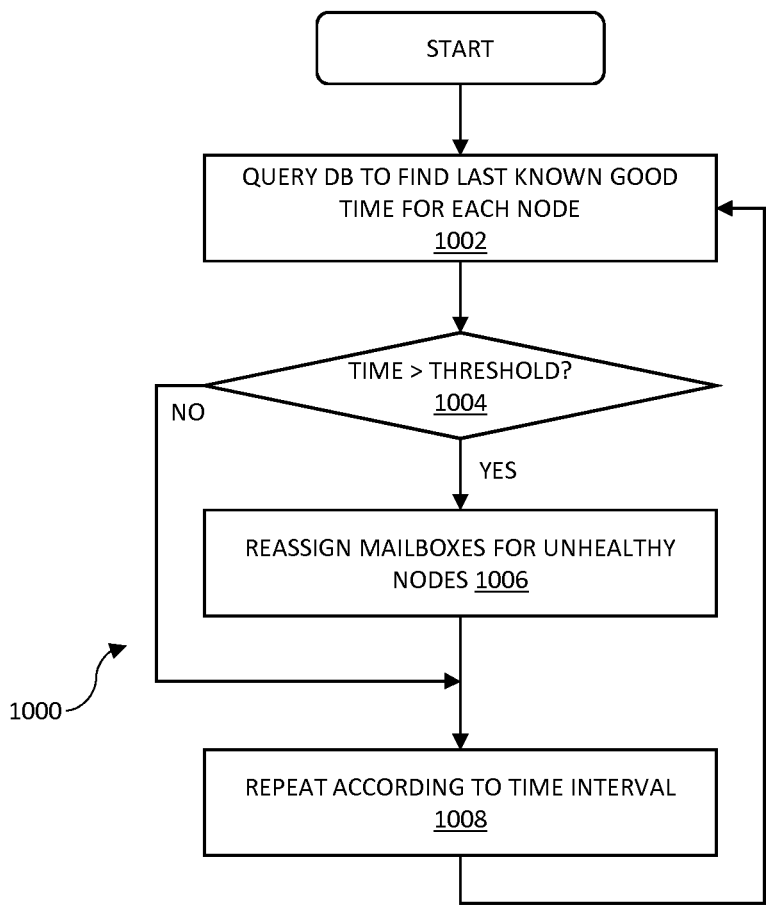
FIG. 10 is a flow chart showing a method for assigning mailboxes to computer nodes in the event of a failover event in accordance with an embodiment.

FIG. 10 shows an example of a method executed by the master node to monitor the health of the monitoring nodes 110 based on the node table 900. In this embodiment, the method 500 is performed by the second monitoring node 110-2 which acts as the master node for system 100 but it will be appreciated that the method may be performed by any of the plurality of monitoring nodes 110 of FIG. 1 which have assumed the master node role. According to this method, the monitoring node 110-2 first queries the node table 900 to determine the node time 904-2 for each monitoring node 110 [step 1002]. Next, the monitoring node 110-2 compares the node time 904-2 for each monitoring node 110 to a threshold time to determine whether the node in question is healthy or unhealthy [step 1004]. Next, if a monitoring node 110 is found to be unhealthy, the master node 1006 proceeds to reassign mailboxes from the unhealthy monitoring node 110 to one or more healthy monitoring nodes 110, thereby effecting failover of the monitoring node in question [step 1006]. In contrast, if the monitoring nodes 110 are found to be healthy, the monitoring node 110-2 proceeds to wait for a predetermined time interval before repeating the method 1000 [step 1008].

It will be appreciated that various aspects described above involve the use of timestamps by the monitoring nodes 110 in the system 100 of FIG. 1. To avoid problems associated with clock skew and drift between the clocks associated with respective monitoring nodes 110, the monitoring nodes 110 may be configured to generate timestamps using a clock provided by the database server 130. For example, the monitoring nodes 110 may request a timestamp using the CURRENT_TIMESTAMP( ) SQL statement.

It will be appreciated that at least parts of the methods discussed above with reference to FIGS. 1 to 10 may be implemented using software instructions stored on a computer useable storage medium for execution by a computing device. As an example, an embodiment of a computer program product includes a computer useable storage medium to store a computer readable program that, when executed on a computing device, causes the computing device to perform operations, as described hereinbefore. Furthermore, embodiments of the invention can be embodied in the form of a computer program product accessible from a computer-usable or computer-readable medium providing program code for use by or in connection with a computing device or any instruction execution system. For the purposes of this description, a computer-usable or computer-readable medium can be any apparatus that can contain, store, communicate, propagate, or transport the program for use by or in connection with the instruction execution system, apparatus, or device. The apparatus may be a transitory or a non-transitory computer-readable medium. For example, the computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital versatile disk (DVD).

Figure 11:
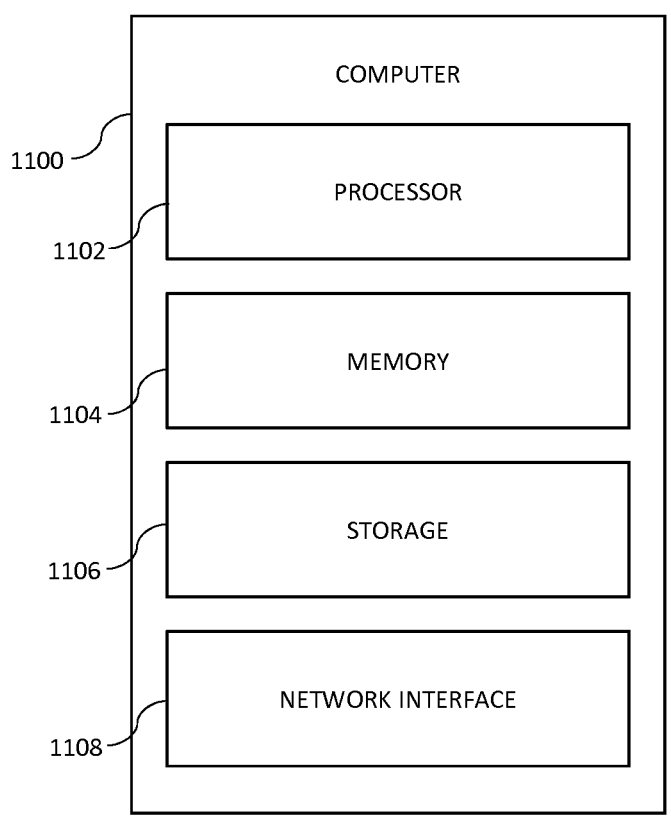
FIG. 11 is a schematic diagram showing a computing node in accordance with an embodiment.

Embodiments of the proxy server 120 described above with reference to FIGS. 1 to 10 is typically performed by a computer that executes computer readable instructions. FIG. 11 depicts schematically an example of a suitable computer 1100 that includes a processor 1102, a memory 1104, a storage device 1106 and a network interface 1108. The processor 1102 may include a multifunction processor and/or an application-specific processor, examples of which include the PowerPC™ family of processors by IBM™ and the x86 and x86-64 family of processors by INTEL™. The memory 1104 within the computer is typically RAM and storage device 1106 is typically a large capacity permanent storage device such as a magnetic hard disk drive or solid state memory device. The network interface 1108 enables communications with other computers in a network using as suitable protocol, such as the Internet Protocol (IP) and the processor 1102 executes computer readable instructions stored in storage 1106 to implement embodiments of the invention as described hereinbefore with reference to FIGS. 1 to 10.

The above embodiments are to be understood as illustrative examples of the invention. Further embodiments of the invention are envisaged. For example, further embodiments may employ an alternative technique for determination of the master node, such as a distributed election method. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A system for monitoring a plurality of mailboxes by a plurality of computer nodes, the plurality of computer nodes comprising a first computer node comprising at least one first processor and at least one first memory comprising first computer program instructions, and a second computer node comprising at least one second processor and at least one second memory comprising second computer program instructions, wherein the at least one first memory and the first computer program instructions are configured to, with the first processor, cause the first computer node to:
monitor a plurality of mailboxes hosted by a first server remote from the first computer node, wherein the monitoring the plurality of mailboxes comprising monitoring attribute changes associated with the plurality of mailboxes;
receive a change of an attribute associated with a mailbox in the plurality of mailboxes, the change of the attribute associated with the mailbox indicating a change of a server hosting the mailbox; and
update, by the first computer node, a database record associated with the mailbox to store data indicative of the change of the attribute, wherein the change of the attribute of the database record associated with the mailbox indicates that the mailbox is not monitored by any of the computer nodes in the plurality of computer nodes; and wherein the at least one second memory and the second computer program instructions are configured to, with the second processor, cause the second computer node to:
detect the update, made by the first computer node, to the database record;
determine, in response to detecting the update to the database record, a third computer node in the plurality of computer nodes to monitor the mailbox, based at least in part on the data indicative of the change of the attribute stored in the database record; and
update the database record to store an identifier corresponding to the third computer node, wherein the second computer node provides assignment of the mailbox to the third computer node in response to the second computer node determining that the database record associated with the mailbox is not monitored by any of the computer nodes in the plurality of the computer nodes.

2. The system of claim 1, further comprising:
a third computer node configured to:
detect the update to the database record by the second computer node; and configure a monitoring process for monitoring the mailbox based, at least in part, on the data indicative of the change of the attribute stored in the database record.

3. The system of claim 2, wherein the second computer node is configured to update the database record associated with the mailbox to store time data indicative of a time at which the identifier indicative of the third computer node was stored in the database record by the second computer node.

4. The system of claim 3, wherein the third computer node is configured to detect the update to the database record made by the second computer node based on the time data stored by the second computer node.

5. The system of claim 1, wherein:
the first computer node is configured to:
update the database record associated with the mailbox to indicate that the mailbox is not monitored by any of the computer nodes in the plurality of computer nodes; and
the second computer node is configured to:
determine that the database record has been updated by determining that the mailbox is not monitored by any of the computer nodes in the plurality of computer nodes.

6. The system of claim 1, wherein the database record is stored at a database server which is remote from the first computer node and the second computer node.

7. The system of claim 1, wherein the attribute comprises data indicating that the mailbox is hosted by a second server, different from the first server, which is remote from the first computer node.

8. The system of claim 1, wherein the mailbox is an email mailbox and the attribute is an attribute of the email mailbox.

9. A system for monitoring a plurality of mailboxes by a plurality of computer nodes, the plurality of computer nodes comprising a first computer node comprising at least one first processor and at least one first memory comprising first computer program instructions, and a second computer node comprising at least one second processor and at least one second memory comprising second computer program instructions,
wherein the at least one first memory and the first computer program instructions are configured to, with the first processor, cause the first computer node to:
detect an update to a database record hosted by a database server and associated with a mailbox, wherein the database server host a plurality of database records of a plurality of mailboxes hosted by a plurality of servers, the plurality of servers are remote from the first computer node in a plurality of computer nodes, and the update to the database record comprises data indicative of a change of an attribute associated with the mailbox, wherein the change of the attribute of the database record associated with the mailbox indicates that the mailbox is not monitored by any of the computer nodes in the plurality of computer nodes;
determine, in response to detecting the update to the database record, a second computer node in the plurality of computer nodes to monitor the mailbox, based at least in part on the data indicative of the change of the attribute stored in the database record; and
update the database record to store an identifier corresponding to the second computer node, wherein the first computer node provides assignment of the mailbox to the second computer node in response to the first computer node determining that the database record associated with the mailbox is not monitored by any of the computer nodes in the plurality of the computer nodes; and wherein the at least one second memory and the second computer program instructions are configured to, with the second processor, cause the second computer node to:
detect the update to the database record by the first computer node based at least in part on the identifier; and
configure a monitoring process for the mailbox based, at least in part, on the data indicative of the change of the attribute stored in the database record, wherein the monitoring process for the mailbox comprises:
monitoring and receiving attribute changes associated with the mailbox; and
updating the database record associated with the mailbox to store data indicative of the attribute changes.

10. The system of claim 9, wherein the first computer node is configured to update the database record associated with the mailbox to store time data indicative of a time at which the identifier corresponding to the second computer node was stored in the database record.

11. The system of claim 10, wherein the second computer node is configured to detect the update to the database record made by the first computer node based on the time data stored by the first computer node.

12. The system of claim 9, wherein the attribute comprises data identifying a server remote from the second computer node which hosts the mailbox.

13. The system of claim 9, wherein the mailbox is an email mailbox and the attribute is an attribute of the email mailbox.

14. A method for monitoring a plurality of mailboxes by a plurality of computer nodes, method comprising:
monitoring, by a first computer node, a plurality of mailboxes hosted by a first server remote from the first computer node, wherein the monitoring the plurality of mailboxes comprising monitoring attribute changes associated with the plurality of mailboxes;
receiving, at the first computer node, a change of an attribute associated with a mailbox in the plurality of mailboxes;
updating, by the first computer node, a database record associated with the mailbox to store data indicative of the change of the attribute, wherein the change of the attribute of the database record associated with the mailbox indicates that the mailbox is not monitored by any of the computer nodes in the plurality of computer nodes;
detecting, at a second computer node, the update made by the first computer node to the database record;
determining, by the second computer node and in response to detecting the update to the database record, a third computer node in the plurality of computer nodes to monitor the mailbox, based at least in part on the data indicative of the change of the attribute stored in the database record; and
updating the database record to store an identifier corresponding to the third computer node by the second computer node, wherein the second computer node provides assignment of the mailbox to the third computer node in response to the second computer node determining that the database record associated with the mailbox is not monitored by any of the computer nodes in the plurality of the computer nodes.

* * * * *

UNITED STATES PATENT AND TRADEMARK OFFICE
CERTIFICATE OF CORRECTION

| | |
|---|---|
| PATENT NO. | : 10,693,826 B2 |
| APPLICATION NO. | : 15/513114 |
| DATED | : June 23, 2020 |
| INVENTOR(S) | : Pulla et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 301 days.

Signed and Sealed this
Twenty-fourth Day of January, 2023

Katherine Kelly Vidal
*Director of the United States Patent and Trademark Office*